United States Patent [19]

Raynal

[11] Patent Number: 4,618,828
[45] Date of Patent: Oct. 21, 1986

[54] INSULATING SEGMENT FOR A DRILL STRING ELECTRODE STRUCTURE

[75] Inventor: Jean C. Raynal, Pau, France

[73] Assignee: Teleco Oilfield Services Inc., Meriden, Conn.

[21] Appl. No.: 440,753

[22] Filed: Nov. 12, 1982

[51] Int. Cl.⁴ .......................... G01V 3/20; E21B 49/00
[52] U.S. Cl. ...................................... 324/347; 73/152; 175/50; 324/369
[58] Field of Search ............... 324/347, 356, 366, 367, 324/369, 373; 73/152; 250/254; 175/40, 48, 50

[56] References Cited

U.S. PATENT DOCUMENTS

| | | | |
|---|---|---|---|
| 3,072,843 | 1/1963 | Clements et al. | 324/347 |
| 3,124,742 | 3/1964 | Schneider | 324/373 |
| 3,268,801 | 8/1966 | Clements et al. | 324/347 X |
| 4,286,217 | 8/1981 | Planche et al. | 324/347 |
| 4,356,629 | 11/1982 | Jeter et al. | 166/66 X |
| 4,461,997 | 7/1984 | Ohmer | 73/152 X |

FOREIGN PATENT DOCUMENTS 685727  5/1964  Canada ................. 324/373

*Primary Examiner*—Gerard R. Strecker
*Attorney, Agent, or Firm*—Fishman & Dionne

[57] ABSTRACT

An insulating segment for a drill string electrode structure is presented. The insulating segment of the drill string includes a drill string segment having a recess along an axial length thereof with a first sleeve of insulating material in the recess on the recessed surface of the drill string segment and a second sleeve of insulating material on the first sleeve of insulating material. The first end second sleeves of insulating material are of different hardnesses, with the second sleeve being harder than the first sleeve. A plurality of electrode are embedded in the second sleeve.

7 Claims, 9 Drawing Figures

INSULATING SEGMENT FOR A DRILL STRING ELECTRODE STRUCTURE

FIELD OF THE INVENTION

This invention relates to the field of the sensing of borehole parameters, particularly parameters of interest in the drilling of oil well boreholes. More particularly, this invention relates to the measurement of apparent formation resistivity, and more particularly to a novel electrode array and the structure of and methods of forming the insulation and electrode arrays.

DISCUSSION OF THE PRIOR ART

The desirability of measuring apparent formation resistivity during borehole drilling is well known in the art. This subject has been widely discussed in the literature, including the patent literature, and many proposals have been made for apparatus and systems to measure apparent formation resistivity.

The general concept involves the mounting of electrodes on a segement of the drill string at a downhole location. One typical prior art arrangement is shown in FIG. 1 and involves an array of four electrodes, A, B, M and N mounted on an insulated segment S of a steel drill string segment D. Current $I_1$ from electrode A is directed through the formation F and is collected at electrode B. The voltage drop across electrodes M-N is measured by volt meter V, and the apparent formation resistivity $R_f$ is determined from the values $I_1$ and $\Delta V_{MN}$. However, a serious inaccuracy exists in this typical prior art system because a substantial leakage current path $I_2$ exists between electrode A and drill collar segment D. Thus, while the total value of the current generated at electrode A is a current level I, only part of that current $I_1$, flows to electrode B through the formation F, and substantial leakage current $I_2$ is set up in the system. As a result, the voltage drop $\Delta V_{MN}$ is a function of only the current component $I_1$ (the value of which is unknown even if the total current I generated at electrode A is known) and hence the calculated value $R_f$ of apparent formation resistivity is inaccurate. One possible approach to resolving this problem of the prior art is to provide an extremely long insulated section S for the drill string in an attempt to interrupt or minimize the leakage current from electrode A to the drill string segment. However, the use of an exceptionally long insulated section of drill collar is impracticable because it creates a number of other problems of its own.

SUMMARY OF THE INVENTION

The above discussed problem of the prior art is overcome or alleviated by the electrode structure of the present invention. In accordance with the present invention, an electrode array of five electrodes is mounted on a relatively short insulated segment of a drill string. As in the prior art, current flows from the first electrode to second electrode, and the voltage drop is sensed by third and fourth electrodes between the first and second electrodes. However, any leakage current from the first electrode is collected by the fifth electrode and is kept isolated from the current flowing between the first and second electrodes. A current source, preferably a constant current source, is used, and the current in the circuit of the first and fifth electrodes is determined. Thus, the current which causes the voltage drop between the third and fourth electrodes is accurately known, and the apparent formation resistivity $R_f$ can be accurately determined.

The present invention also presents improved electrode structures for mounting on a drill string segment and improved methods of forming the electrodes or mounting the electrodes on the drill string segment.

DESCRIPTION OF THE DRAWINGS

Referring to the drawings, wherein like elements are numbered alike in some of the FIGURES.

DESCRIPTION OF THE PREFERRED EMBODIMENTS

Figure 1:
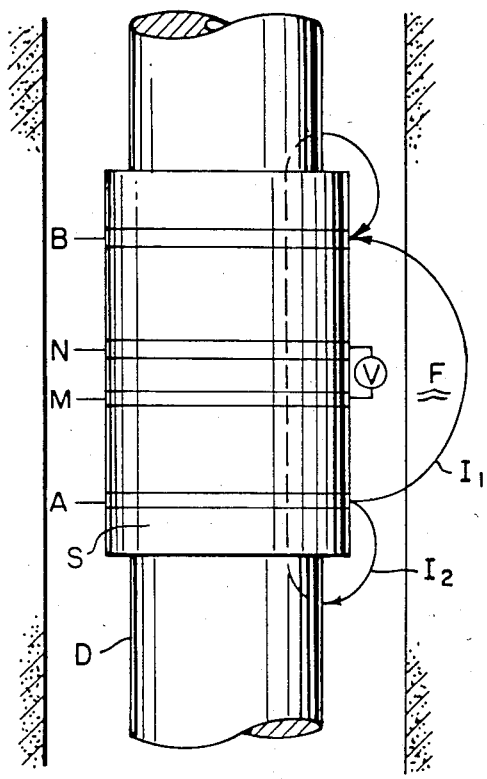
FIG. 1 is an illustration of a typical prior art array of four electrodes, as discussed above.
Figure 2:
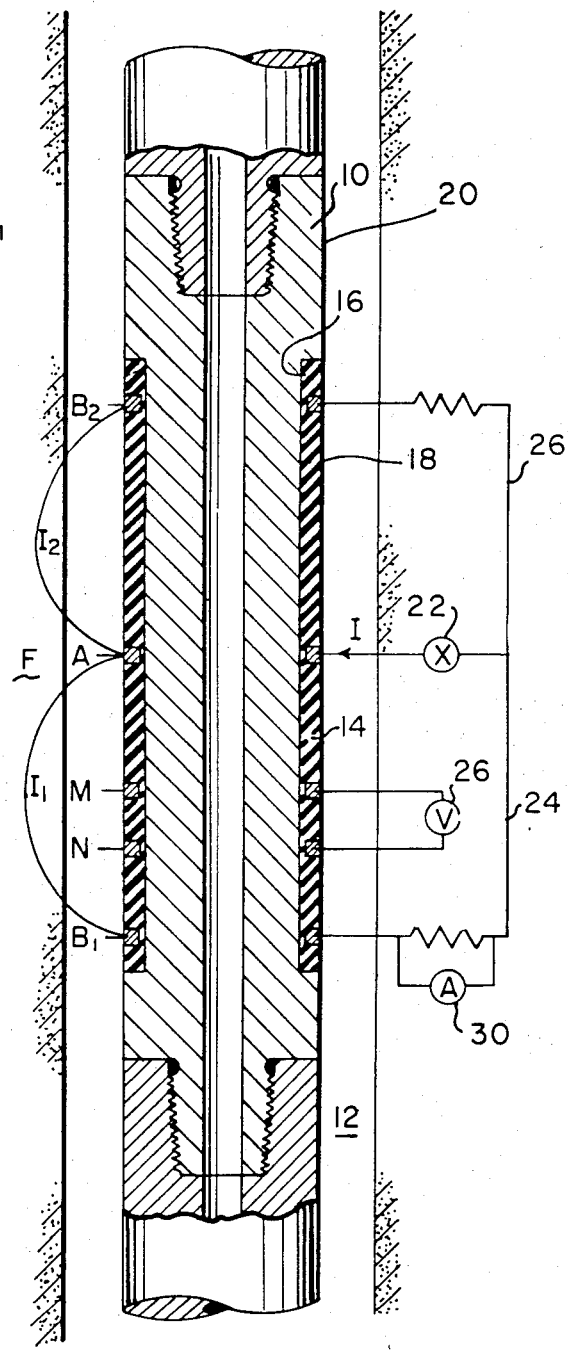
FIG. 2 is a schematic representation of the electrode array of the present invention.

Referring now to FIG. 2, a general configuration of the electrode array of the present invention is shown. A drill string segment 10 is shown in borehole 12 which has been drilled in an earth formation F. As is standard in the art, drill string segment 10 is a length of steel pipe which has junction structure at each end for joining to other similar drill string segments to form an elongated drill string. A length of insulating material 14 fills a cylindrical recess or housing 16 on the surface of the drill collar so as to form an annular ring of insulation, the outer surface 18 of which is flush with the outer surface 20 of the drill string segment. Insulation 14 may be any suitable material to meet the requirements of providing electrical insulation and enduring the environment in which the drill string collar must operate.

An array of five annular electrodes A, $B_1$, $B_2$, M and N are embedded in the insulating material 14. The electrodes may be any suitable conducting material, such as iron, and they are in the form of annular rings the outer surface of which may be flush with or slightly recessed below the outer surface of insulation layer 14. As will be observed, while the electrodes are embedded in the insulating material 14, they are spaced from the outer surface of recess 16, because the electrodes must be insulated from steel drill string segment 10. Electrodes M and N are positioned between electrodes A and $B_1$, while electrode $B_2$ is spaced from electrode A on the side opposite to electrode $B_1$. Electrode $B_1$ is the most downhole, i.e., closest to the drill bit, in the array, and electrode $B_2$ is the most uphole, i.e., farthest from the bit, in the array. A constant current source 22 is connected to electrode A; electrode $B_1$ is connected in a return circuit 24 to constant current source 22; electrode $B_2$ is connected in a return circuit 26 to constant current source 22; and a volt meter 26 is connected between electrodes M and N.

When constant current source 22 delivers a current I to electrode A, a current path $I_1$ is set up from electrode A through formation F to electrode $B_1$. As discussed previously, in the prior art a leakage current path was also set up between electrode A and the drill collar, thus impairing the measurement of apparent formation resistivity. However, in the present invention, the previous leakage current is collected by the electrode $B_2$ which cooperates with electrode A to define a second current path $I_2$. The relationship then exists that the current I from constant current source 22 is equal to $I_1$ plus $I_2$. ($I=I_1+I_2$). The current $I_1$ flows in circuit 24, while the current $I_2$ flows in circuit 26, the leakage current to the drill collar is essentially eliminated or reduced to an insignificant amount. The value of $I_1$ can be measured directly by an ammeter 30, or the current $I_1$ can be determined indirectly by measuring the current $I_2$ in circuit 26 and subtracting from the total current I. In either event, the current value $I_1$ can be accurately determined, and hence the value of the current $I_1$ which is responsible for the voltage drop between electrodes M and N ($\Delta V_{MN}$) is accurately known. The voltage drop $\Delta V_{MN}$ is measured by volt meter 26. With the values for $I_1$ and $\Delta V_{MN}$ accurately known, the apparent formation resistivity $R_f$ can then be accurately calculated. The measured voltage and current values can be transmitted to the surface of a borehole by mud pulse telemetry or any other known transmission technique, or a calculation can be made from the voltage and current values by downhole equipment to calculate the apparent formation resistivity for transmission to the surface. In either event the valuable information of apparent formation resistivity can be accurately known at the surface of the well.

The insulation material 14 may be selected from among many different available insulating materials as long as certain minimum fundamental requirements are met. The material must, of course, be electrically nonductive. It must be stable (i.e., not decompose, soften or otherwise change its characteristics) for temperatures up to about 150° C.; it must be compatible with the drilling mud (which will fill the annulus between the drill string segment and the formation) and it must be resistant to oil or gas which may be present in the drilling mud. The insulating material must also be compatible with the steel drill collar to the extent that it can be bonded or otherwise securely adhered to the drill collar; it will not shrink significantly relative to the drill collar; and it should have a thermal coefficient of expansion closely matched to that of the drill collar if the material is not resilient. Within the boundaries of these requirements, the insulating material may, for example, be selected from material or synthetic rubber, ceramics, thermosetting molding materials such as polyurethanes, thermoplastic molding materials such as polyamides, polystyrenes and polypropylenes or epoxy materials.

Figure 3:
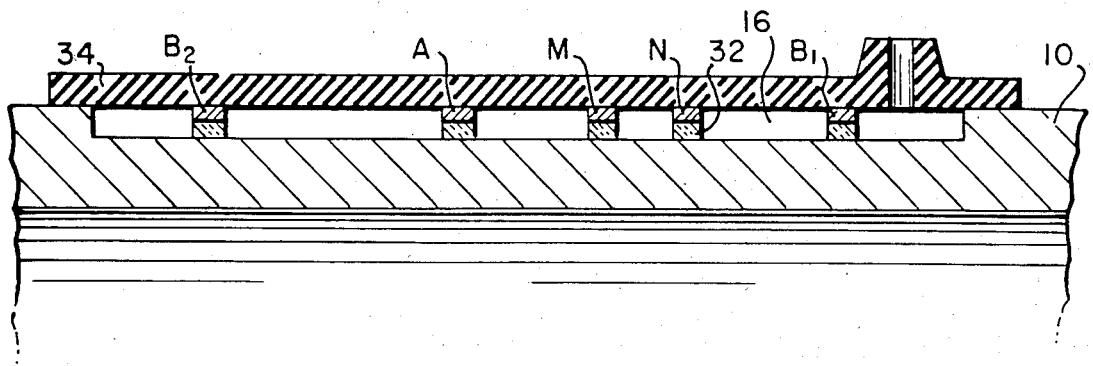
FIG. 3 shows apparatus and a method for forming the electrode and insulation structure.

FIG. 3 shows an arrangement in which the array of electrodes embedded in the insulation may be formed. As shown in FIG. 3, support elements 32 are mounted on drill string segment 10 at positions spaced apart along the axis of the drill string segment corresponding to the desired locations for the five annular electrodes. These support elements 32 may be any suitable electrically insulated elements as long as they are shaped or configured to permit the flow of insulating material in the axial direction along the outside of the drill string segment. The electrodes A, $B_1$, $B_2$, M and N are then positioned on the respective support elements 32. It will be understood that the ring electrodes may have to be split in segments and then joined together in order to mount them on the drill string. After the electrodes have been placed in position, a mold 34 is then positioned around the electrode array and fully encloses recess 16 to define recess 16 as a mold cavity. A molding material, such as a thermosetting polyurethane molding material, is then injected at appropriate pressure and temperature into mold 34 to fill up the mold cavity which corresponds to recess 16. The mold is then removed after appropriate curing, and the resulting structure is an array of annular electrodes embedded in an annular length of insulating material recessed in a segment of the drill string.

Figure 4:
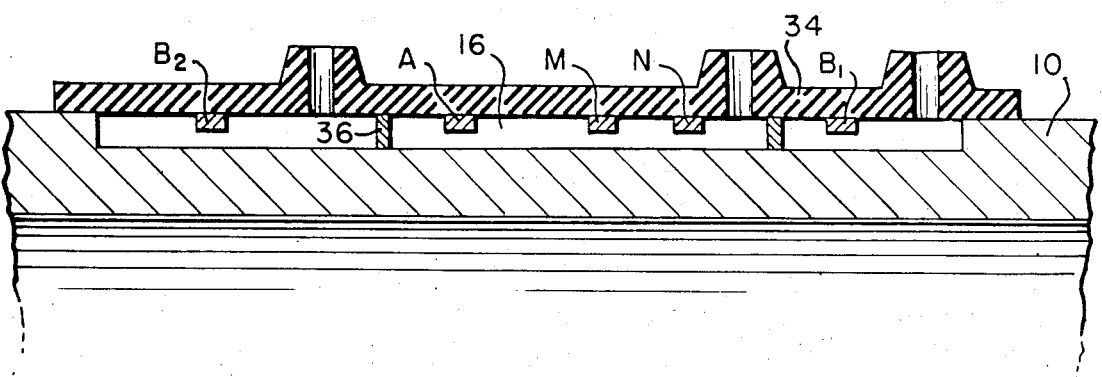
FIG. 4 shows a modification of FIG. 3 to incorporate expansion partitions in the insulation.

Referring to FIG. 4, a modified version of the configuration of FIG. 3 is shown with an accommodation made to compensate for different coefficients of expansion between the insulating material and the drill string segment. That compensation is accomplished by locating annular expansion blocks or partitions 36 at selected locations along the length of recess 16. Expansion blocks or partitions 36 are resilient and elastic materials (such as synthetic rubber) so that they will compress and expand to absorb differential expansion between the drill collar 10 and the insulating material. The expansion blocks or partitions 36 serve to divide the recess 16 into a series of insulating segments (three in the illustration of FIG. 4). Therefore, it becomes necessary to modify the mold 34 to provide for injection of the uncured insulating material into each of the partitioned segments of recess 16 in order to properly form the segmented insulating structure which results from the FIG. 4 arrangement.

Figure 5:
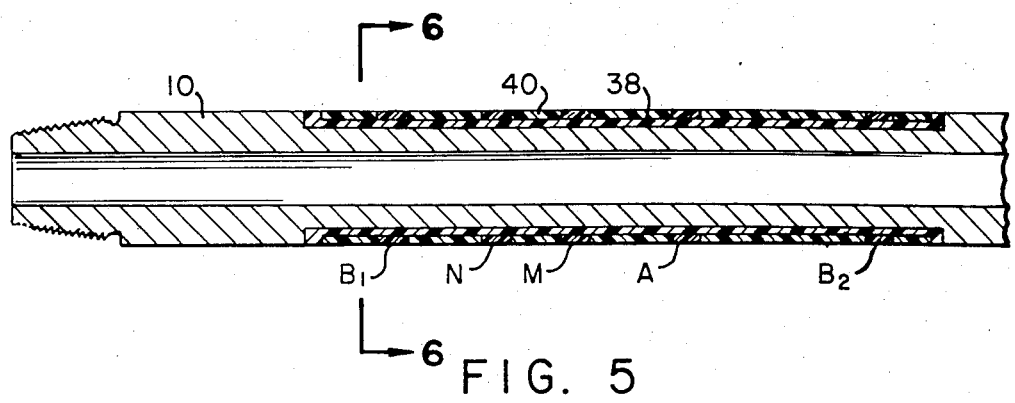
FIG. 5 shows another modified insulation structure.

The insulating segment of the drill string operates in a relatively hostile environment where it is exposed to mud, sand, cuttings, rocks and other formation elements in the borehole being drilled. Because of the hostile environment, it may be desirable to construct the insulation structure out of two different materials, a hard outer sleeve which will be exposed to the hostile drilling environment, and a softer inner sleeve between the hard outer sleeve and the drill collar so that the hard outer sleeve will be able to yield or comply if it encounters a high lateral load, i.e., loading perpendicular to the axis of the drill string segment. A multiple sleeve arrangement of this type is shown in FIG. 5 wherein the drill string segment 10 has an inner insulating sleeve 38 adjacent the recessed surface of the drill string segment and an outer insulating sleeve 40 adjacent to the inner sleeve 38. Outer sleeve 40 is a relatively hard sleeve of insulating material, while inner sleeve 38 is a sleeve of relatively soft material. Thus, sleeve 40 will serve to provide abrasion and similar protection, while sleeve 38 will permit absorbtion of lateral loads.

The structure of FIG. 5 poses two potential problems. One problem is the possibility of angular displacement between outer sleeve 40 and inner sleeve 38 resulting from torsional loads on the outer sleeve. The other problem results from the fact that the electrodes must be contained in the outer sleeve 40. Since the outer sleeve 40 must, of necessity, be thinner than the total thickness of the combined insulating material of sleeves 38 and 40, only a reduced amount of material is available for forming the grooves in sleeve 40 to receive the electrodes, and hence the sleeve 40 is weakened at each of the electrode locations. These problems are addressed and resolved by the structure of FIGS. 6 and 7.

Figure 6:
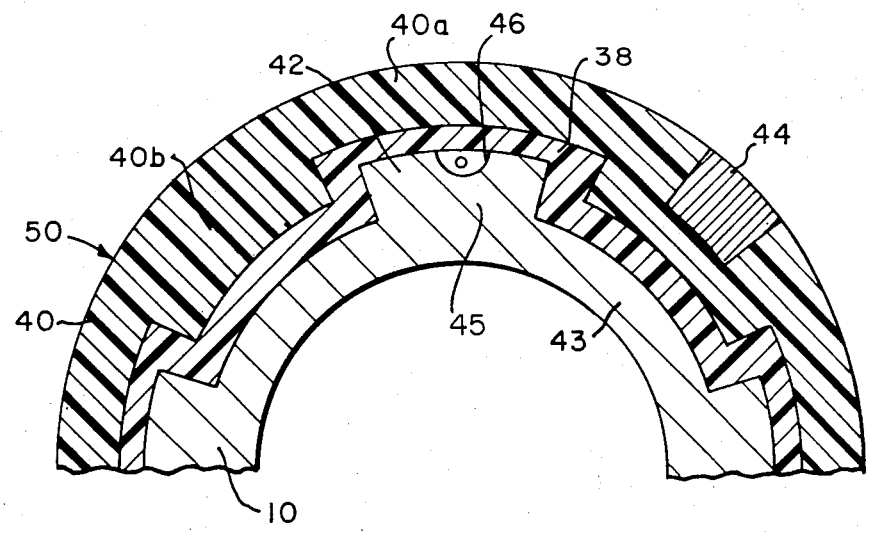
FIG. 6 shows a modification of the FIG. 5 structure.

Referring now to FIG. 6, a modified configuration is shown in a cross sectional view with the section taken perpendicular to the axis of the drill string segment. In this configuration, drill collar 10 is formed with spline segments 42 to form alternating axial lengths of thin and thick segments 43 and 45, respectively. The relatively soft inner insulating sleeve 38 conforms to the spline configuration of the outer surface of drill string segment 10 in a layer of relatively constant thickness or depth, while the outer harder sleeve of insulating material 40 has thin segments 40a in radial alignment with the splines 42 and thicker segments 40b in radial alignment with the recesses between adjacent splines on the drill string. This interlocking sleeve and drill string structure shown in FIG. 6 will accommodate lateral deflection of the outer hard sleeve 40 but will reduce or limit the angular displacement between the hard outer sleeve 40 and the drill string 10.

In the FIG. 6 arrangement, the electrode shape is also changed so tht each electrode is in the form of a cubic element 44 rather than the annular ring previously described. The cubic shaped electrodes are positioned in the thicker sections 40b of the hard outer insulating sleeve 40, so that the entire sleeve is not weakened by a ring electrode. While only one electrode 44 is shown at an axial station in FIG. 6, it will be understood that a plurality of such electrodes may be located at two or more of the thicker segments 40b at each axial electrode station.

Figure 7:
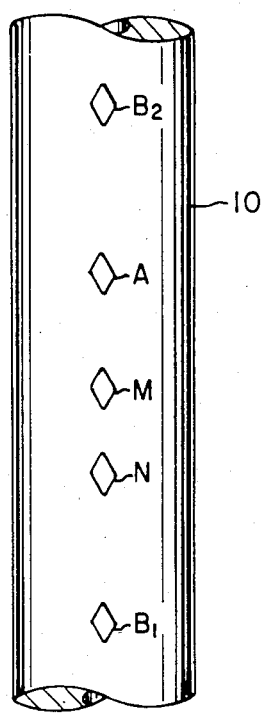
FIG. 7 shows another modified electrode structure.

FIG. 7 shows still another modification of the structure which is particularly advantageous when employing the arrangement of two sleeves of insulating material as in FIG. 5 or 6. A problem which may result from the embedding of hard iron ring electrodes in a hard outer insulating sleeve is that any axial force imposed on the electrode resulting from interference with rock or other debris in the annulus will be fully transmitted to and imposed on the hard outer insulating sleeve. Such loads could, if sufficiently high, cause serious damage to the electrode or the insulating sleeves and could disable the apparent formation resistivity sensing structure. This problem of axial loading is reduced by the electrode structure shown in FIG. 7, wherein each of the electrodes is a diamond shaped segment. If the electrode encounters interference with a rock or other piece of debris, the forces will be generated along the inclined surfaces of the electrode, and the electrode will tend to displace slightly in either an axial or lateral direction in response to the force. Such displacement will reduce the likelihood of damage to the electrode or its boundary connections with the insulating material, thus extending the life of the structure.

While wiring of the electrodes has not been discussed, it will, of course, be understood that the electrodes must be connected by wire to an electronic package in the drill string (which will also house the voltmeter and ammeter). That wiring may be accomplished in any convenient manner, such as by a protective tube running along the inner surface of recess 16 or by a groove, such as groove 46 in spline segment 42 of the FIG. 6 arrangement. Connection from those protected wires to the electrodes may, for example, be made by means of helicoidally shaped wires to accommodate relative movement between the electrodes and the drill string segment 10.

Figure 8:
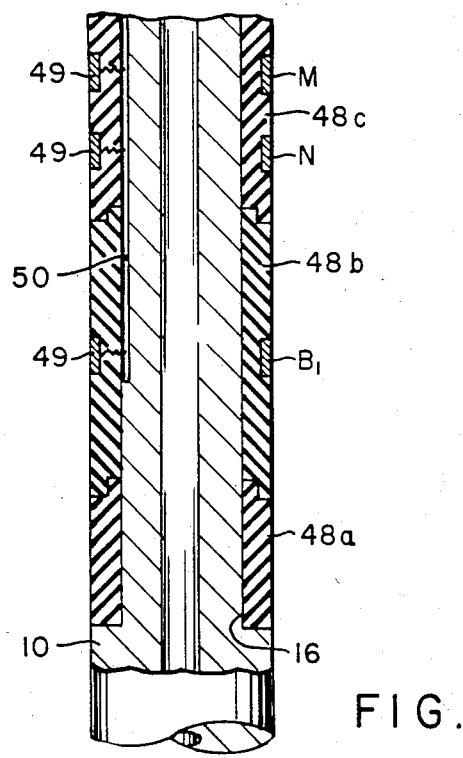
FIGS. 8 and 9 show further modifications of electrode and insulation structures.

FIG. 8 shows still another alternate configuration for the insulation and electrode structure. In the FIG. 8 arrangement, the insulation sleeve is made up of a band 48 of elastomeric nonconductive material. Band 48 could be formed from a plurality of interlocking rings or segments 48(a), 48(b) and 48(c), for example. The electrodes are composed of rings or bands of conductive elastomeric material 49 in appropriately located recesses in the band of nonconductive material. Elastomeric materials 48 and 49 may be the same or similar base materials to match coefficients of expansion, with the conductive bands 49 being filled with silver, carbon or other conductive material to make the bands conductive electrodes. The band of nonconductive and conductive elastomeric material may be mounted on the drill collar segment by being molded in place, or, if desired, by being stretched and slipped over the thicker section of the drill string segment and then released to contract into place in the recess 16. A tube 50 is shown in FIG. 8, the tube 50 housing appropriate wiring which is connected by helical segments to each of the electrodes. Only three of the electrodes are shown in FIG. 8, but it will be understood that two additional electrodes would be employed to complete the array of FIG. 2.

Figure 9:
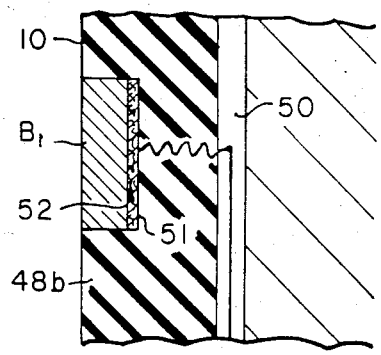

Referring to FIG. 9, an improved detail of effecting electrical connection to the elastomeric electrode of FIG. 8 is shown. In the FIG. 9 arrangement, a recess or groove 51 in the nonconductive elastomer 48(b) is coated with a resilient conductive material, such as a band of resilient metalic turnings (as in the nature of steel wool) or woven conductive cable indicated at 52. The helical circuit wire is physically and electrically connected to this ring of conductive turnings or steel wool material 52, and the material 52 forms multiple electrical contacts with the conductive elastomer electrode. In this way, electrical continuity from the electrode to the circuit wire is assured.

It is to be understood that while the details of electrode construction disclosed herein are considered to be important, the basic concept of the five electrode array and its improved results are not limited to the details of electrode construction set forth herein.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrode structure for a drill string, including:
    a drill string segment having a recess defining a recessed surface along an axial length thereof;
    a first sleeve of insulating material in said recess on the recessed surface of said drill string segment;
    a second sleeve of insulating material on said first sleeve of insulating material;
    said first and second sleeves of insulating material being of different hardness, with said second sleeve being harder than said first sleeve, said second sleeve of insulating material providing protection against abrasion and said first sleeve permitting absorption of lateral loads; and a plurality of electrodes embedded in said second sleeve.

2. An electrode structure from a drill string as in claim 1 including:
    spline elements formed on the outer surface of said drill string segment in said recess to form alternating axial lengths of thinner and thicker segments;
    said first sleeve conforming to said drill string segment and splines in a coating of relatively uniform thickness; and
    said second sleeve having alternating axial lengths of thicker and thinner segments in alignment with the thinner and thicker segment, respectively, of said drill string segment.

3. An electrode structure for a drill string as in claim 2 wherein:
said electrodes are embedded in said thicker segments of said second sleeve.

4. An electrode structure for a drill string as in claim 3 wherein:
said electrodes are generally cubic elements.

5. An electrode structure for a drill string as in claim 3 wherein:
said electrodes are generally diamond shaped.

6. An electrode structure for a drill string as in claim 3 including:
channel means in at least one of said thicker segments of said drill string segment; and
electric conductor means in said channel means for connection to said electrodes.

7. An electrode structure for a drill string as in claim 1 wherein:
said electrodes are generally diamond shaped.

* * * * *